United States Patent
Zia et al.

(10) Patent No.: US 12,117,805 B2
(45) Date of Patent: Oct. 15, 2024

(54) SYSTEM AND METHOD FOR GENERATING INDUSTRIAL PROCESSES IN A COMPUTING ENVIRONMENT

(71) Applicant: RETROCAUSAL, INC., Redmond, WA (US)

(72) Inventors: Muhammad Zeeshan Zia, Sammamish, WA (US); Quoc-Huy Tran, Redmond, WA (US); Andrey Konin, Redmond, WA (US)

(73) Assignee: Retrocausal, Inc.

( * ) Notice: Subject to any disclaimer, the term of this patent is extended or adjusted under 35 U.S.C. 154(b) by 114 days.

(21) Appl. No.: 18/350,004

(22) Filed: Jul. 11, 2023

(65) Prior Publication Data

US 2024/0272618 A1  Aug. 15, 2024

Related U.S. Application Data

(60) Provisional application No. 63/445,187, filed on Feb. 13, 2023.

(51) Int. Cl.
*G05B 19/4155* (2006.01)

(52) U.S. Cl.
CPC ........... *G05B 19/4155* (2013.01); *G05B 2219/31449* (2013.01)

(58) Field of Classification Search
None
See application file for complete search history.

(56) References Cited

U.S. PATENT DOCUMENTS

| | | | | |
|---|---|---|---|---|
| 2007/0288250 | A1* | 12/2007 | Lemcke | G06Q 30/00 705/300 |
| 2018/0349767 | A1* | 12/2018 | Xiao | G06N 3/044 |
| 2022/0044119 | A1* | 2/2022 | Wang | G06N 20/00 |

FOREIGN PATENT DOCUMENTS

WO   WO-2022188994 A1 *  9/2022

OTHER PUBLICATIONS

Thomsen, "Towards machine learning for architectural fabrication in the age of industry 4.0", 2020, IJAC, pp. 2-4 (Year: 2020).*
Rai, "Machine learning in manufacturing and industry 4.0 applications", 2021, International Journal of Production Research, pp. 2-6 (Year: 2021).*

* cited by examiner

*Primary Examiner* — David Earl Ogg
(74) *Attorney, Agent, or Firm* — Jason C. Cameron

(57) ABSTRACT

A system and method for generating industrial process in a computing environment is disclosed. The system receives multimedia input from users, analyzes multimedia input, to determine semantics associated with multimedia inputs, using at least one of natural language and symbolic processing techniques, and deep learning technique. Furthermore, the system determines process specifications and descriptions in industrial process, using at least one of a dataset and library comprising representations of industrial processes in plurality of configurations, using machine learning (ML) models. Additionally, the system combines a plurality of types of process specifications and descriptions. Further, the system generates industrial processes corresponding to the multimedia inputs, based on combining the plurality of types of process specifications and descriptions. Furthermore, the system outputs the generated industrial processes, on at least one of display of a user device, and external devices.

18 Claims, 12 Drawing Sheets

SYSTEM AND METHOD FOR GENERATING INDUSTRIAL PROCESSES IN A COMPUTING ENVIRONMENT

CROSS-REFERENCE TO RELATED APPLICATION(S)

This application claims the priority to incorporate by reference the entire disclosure of U.S. Provisional Patent Application No. 63/445,187, filed on Feb. 13, 2023, and titled "System And Method For Generating Industrial Process Representations And Analyses".

TECHNICAL FIELD

Embodiments of the present disclosure generally relate to industrial and warehouse process planning and analysis systems and more particularly relates to a system and a method for generating industrial process in a computing environment, using artificial intelligence (AI) and machine learning (ML) models.

BACKGROUND

Generally, industrial processes are devised and designed for a new industrial assembly, disassembly, or packaging task. For example, manual or robotic assembly of a discrete item is to be improved or designed from scratch. Industrial process design and generation is performed manually and requires imagination of an industrial engineer. This is time-consuming and often does not yield an ideal process. Humans may not remember all possible example layouts and standard operating procedures (SOPs), or parse through them from books. Any given industrial engineering team may also have limited imagination. Further, humans with industrial engineering related skills often do not possess computer programming skills which may be needed to bring industrial process details into digital form. For example, humans may need computer programming skills to analyze the industrial process with a simulator for various analyses.

Currently, existing systems do not use a library of existing (or simulated) industrial processes to generate industrial processes that approximately meet required specifications of the industrial processes. Similarly, existing systems do not generate alternative processes to an existing industrial process.

Consequently, there is a need for an improved system and method for generating industrial process in a computing environment, using artificial intelligence (AI) and machine learning (ML) models.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

An aspect of the present disclosure provides a computer-implemented system for generating industrial process in a computing environment. The system receives one or more multimedia inputs from one or more users. Further, the system analyzes the received one or more multimedia inputs to determine semantics associated with the one or more multimedia inputs, using at least one of natural language or symbolic processing techniques, and a deep learning technique. The semantics comprises at least one of contexts, nuances, linguistics, and modalities. Furthermore, the system determines one or more process specifications and one or more descriptions in an industrial process, using at least one of a dataset and a library comprising representations of industrial processes in a plurality of configurations, using machine learning (ML) models. Additionally, the system combines a plurality of types of one or more process specifications and one or more descriptions. Further, the system generates one or more industrial processes corresponding to the one or more multimedia inputs, based on combining the plurality of types of one or more process specifications and one or more descriptions. Furthermore, the system outputs the generated one or more industrial processes, on at least one of a display of a user device, and one or more external devices.

Another aspect of the present disclosure provides a computer-implemented method for generating industrial processes in a computing environment. The method includes receiving one or more multimedia inputs from one or more users. Further, the method includes analyzing the received one or more multimedia inputs to determine semantics associated with the one or more multimedia inputs, using at least one of natural language processing techniques, and a deep learning technique. The semantics comprises at least one of contexts, nuances, linguistics, and modalities. Furthermore, the method includes determining one or more process specifications and one or more descriptions in an industrial process, using at least one of a dataset and a library comprising representations of industrial processes in a plurality of configurations, using machine learning (ML) models. Additionally, the method includes combining a plurality of types of one or more process specifications and one or more descriptions. Further, the method includes generating one or more industrial processes corresponding to the one or more multimedia inputs, based on combining the plurality of types of one or more process specifications and one or more descriptions. Furthermore, the method includes outputting the generated one or more industrial processes, on at least one of a display of a user device, and one or more external devices.

Yet another aspect of the present disclosure provides a non-transitory computer-readable storage medium having programmable instructions stored therein, That when executed by one or more hardware processors cause the one or more hardware processors to a computer-implemented system for generating industrial process in a computing environment. The processor receives one or more multimedia inputs from one or more users. Further, the processor analyzes the received one or more multimedia inputs to determine semantics associated with the one or more multimedia inputs, using at least one of natural language processing techniques, and a deep learning technique. The semantics comprises at least one of contexts, nuances, linguistics, and modalities. Furthermore, the processor determines one or more process specifications and one or more descriptions in an industrial process, using at least one of a dataset and a library comprising representations of industrial processes in a plurality of configurations, using machine learning (ML) models. Additionally, the processor combines a plurality of types of one or more process specifications and one or more descriptions. Further, the processor generates one or more industrial processes corresponding to the one or more multimedia inputs, based on combining the plurality of types of one or more process specifications and one or more descriptions. Furthermore, the processor outputs the generated one or more industrial processes, on at least one of a display of a user device, and one or more external devices.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF ACCOMPANYING DRAWINGS

The disclosure will be described and explained with additional specificity and detail with the accompanying figures in which:

FIG. 6 illustrates an exemplary block diagram representation of a hardware platform for implementation of the disclosed system, according to an example embodiment of the present disclosure.

Figure 1:
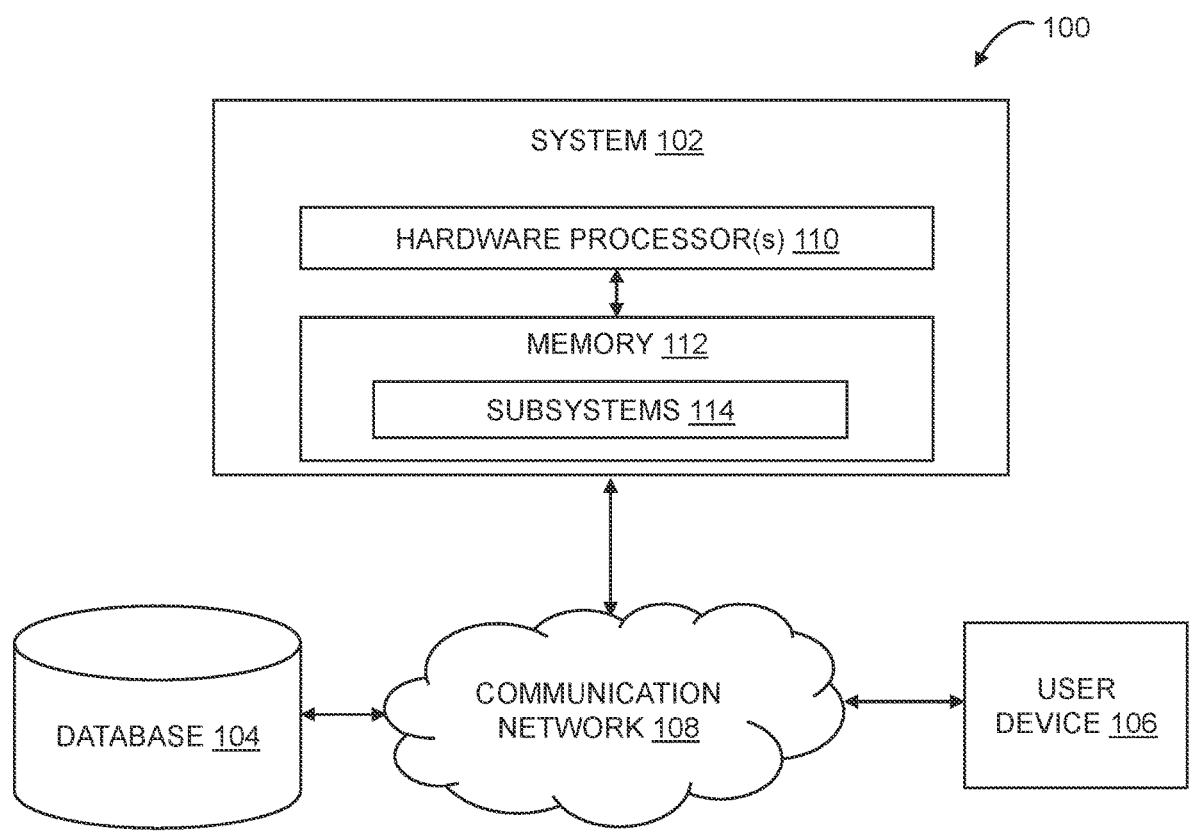
FIG. 1 illustrates an exemplary block diagram representation of a network architecture implementing a system for generating industrial process in a computing environment, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment" "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client, or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or a "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired), or temporarily configured (programmed) to operate in a certain manner and/or to perform certain operations described herein.

Embodiments of the present disclosure provide a system and a method for generating industrial process in a computing environment, using artificial intelligence (AI) and machine learning (ML) models. The present disclosure provides a generative machine learning model which is trained on a library of industrial process specifications (e.g., work cell layout and standard operating procedure (SOP) for a manual or robotic assembly operation and/or computer language descriptions of the process) and/or explanations or descriptions of the process (e.g., natural language explanation and/or images and/or computer language description of the process). Once trained, the machine learning model can generate putative industrial process specification (e.g., work cell layout and standard operation procedure (SOP)) that correspond to an input explanation or description e.g., a natural language description and/or images, or vice versa.

As an example, a user of the system of an embodiment of the system prompts the system with the text, "return a manual process on compact tabletop for screwing parts inside a smartphone including picking up a unit from a conveyor belt, fixing in a fixture, using tweezers to pick up and move material, using screwdriver to tighten six screws, and then taking out the unit from fixture and placing it back on the conveyor for the next workstation on the assembly line. The process should take place without stretching elbow joint by more than 90 degrees" and/or a picture of the workstation. The trained machine learning model takes this prompt and returns a file which contain the complete description of the process including workstation layout in 3D as well as the standard operating procedure for a human to perform the task. As one of many possible examples, the output may be in a format that can be interpreted by process simulation software, so it can be animated out in a physics engine that conducts discrete-event simulation. Another alternative is that a model may generate a video or animation of the process.

The present disclosure enables a user to provide a video or simulation or programming language representation of an industrial process to the trained machine learning model. For example, one where an operator repeatedly installs doors on cars as they arrive in front of them over a moving conveyor belt. In this example, the system (i.e., a machine learning model) may have been trained to return a textual description and/or analysis of the process. In an alternative embodiment, the system may return a textual description of a prescription to improve the process somehow e.g., to improve the ergonomic safety of the operator, or to improve the throughput of the process. In another embodiment, the system may return a video or simulation or programming language representation of an alternative version of the industrial process, e.g., one prompted by the user via a text request that was provided also at input.

Embodiments of the present disclosure provide the machine learning models with neural networks including transformer or graph neural networks, amongst others. Embodiments of training algorithms for these models include back propagation and learning from human feedback. The present disclosure provides a system and method for generating augmented reality or virtual reality (ARNR) representations of the industrial process as output. The present disclosure utilizes industrial process descriptions from industrial processes represented in ARNR. The present disclosure provides a system and method for generating representations that are fed into another system such as a 3D printer or a manufacturing execution system (MES) or an enterprise resource planning (ERP) system, or a simulator, and the like. The present disclosure may be applied to semi-repetitive goal-driven activities in domains other than manufacturing, such as medical or surgical processes, warehousing processes, fulfillment center processes, fitness, exercising and physiotherapy processes, cooking processes, construction processes, and other domains.

FIG. 1 illustrates an exemplary block diagram representation of a network architecture 100 implementing a system 102 for generating industrial process in a computing environment, in accordance with an embodiment of the present disclosure. According to FIG. 1, the network architecture 100 may include the system 102, a database 104, and a user device 106. The system 102 may be communicatively coupled to the database 104, and the user device 106 via a communication network 108. The communication network 108 may be a wired communication network and/or a wireless communication network. The database 104 may include, but is not limited to, dataset, a library comprising representations of industrial processes in a plurality of configurations, textual explanation, images, videos, computer aided design (CAD) data, timing diagrams, representations of human motion, representations of human body shape, representations of machine motion, information regarding components, equipment, furniture, workstation layout, operating procedures, augmented reality (AR) content, virtual reality (VR) content, and raw materials, three-dimensional (3D) printing data, a manufacturing execution system (MES) data, an enterprise resource planning (ERP) data, a simulator data, any other data, and combinations thereof. The database 104 may be any kind of database such as, but are not limited to, relational databases, dedicated databases, dynamic databases, monetized databases, scalable databases, cloud databases, distributed databases, any other databases, and combination thereof.

Further, the user device 106 may be associated with, but not limited to, a user, an individual, an administrator, a vendor, a technician, a worker, a specialist, an instructor, a supervisor, a team, an entity, an organization, a company, a facility, a bot, any other user, and combination thereof. The entities, the organization, and the facility may include, but are not limited to, a hospital, a healthcare facility, an exercise facility, a laboratory facility, an e-commerce company, a merchant organization, an airline company, a hotel booking company, a company, an outlet, a manufacturing unit, an enterprise, an organization, an educational institution, a secured facility, a warehouse facility, a supply chain facility, any other facility and the like. The user device 106 may be used to provide input and/or receive output to/from the system 102, and/or to the database 104, respectively. The user device 106 may present to the user one or more user interfaces for the user to interact with the system 102 and/or to the database 104 for generating industrial process needs. The user device 106 may be at least one of, an electrical, an electronic, an electromechanical, and a computing device. The user device 106 may include, but is not limited to, a mobile device, a smartphone, a personal digital assistant (PDA), a tablet computer, a phablet computer, a wearable computing device, a virtual reality/augmented reality (VR/AR) device, a laptop, a desktop, a server, and the like.

Further, the system 102 may be implemented by way of a single device or a combination of multiple devices that may be operatively connected or networked together. The system 102 may be implemented in hardware or a suitable combination of hardware and software. The system 102 includes one or more hardware processor(s) 110, and a memory 112. The memory 112 may include a plurality of subsystems 114. The system 102 may be a hardware device including the hardware processor 110 executing machine-readable program instructions for generating industrial process in a computing environment. Execution of the machine-readable program instructions by the hardware processor 110 may enable the proposed system 102 to generate industrial process in a computing environment. The "hardware" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors.

The one or more hardware processors 110 may include, for example, microprocessors, microcomputers, microcontrollers, digital signal processors, central processing units, state machines, logic circuits, and/or any devices that manipulate data or signals based on operational instructions. Among other capabilities, hardware processor 110 may fetch and execute computer-readable instructions in the memory 112 operationally coupled with the system 102 for performing tasks such as data processing, input/output processing, and/or any other functions. Any reference to a task in the present disclosure may refer to an operation being or that may be performed on data.

Though few components and subsystems are disclosed in FIG. 1, there may be additional components and subsystems which is not shown, such as, but not limited to, ports, routers, repeaters, firewall devices, network devices, databases, network attached storage devices, servers, assets, machinery, instruments, facility equipment, emergency management devices, image capturing devices, any other devices, and combination thereof. The person skilled in the art should not be limiting the components/subsystems shown in FIG. 1. Although FIG. 1 illustrates the system 102, and the user device 106 connected to the database 104, one skilled in the art can envision that the system 102, and the user device 106 can be connected to several user devices located at different locations and several databases via the communication network 108.

Those of ordinary skilled in the art will appreciate that the hardware depicted in FIG. 1 may vary for particular implementations. For example, other peripheral devices such as an optical disk drive and the like, local area network (LAN), wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the system 102 as is unique to the present disclosure or necessary for an understanding of the present disclosure is depicted and described. The remainder of the construction and operation of the system 102 may conform to any of the various current implementations and practices that were known in the art.

In an exemplary embodiment, the system 102 may receive one or more multimedia inputs from one or more users via the user device 106. The one or more multimedia inputs includes, but is not limited to, a description of at least one of an industrial process and a warehouse process with a random number, a random number, a general textual description, a description without a random number, an alternative random number, a multimedia content, and the like.

In an exemplary embodiment, the system 102 may analyze the received one or more multimedia inputs to determine semantics associated with the one or more multimedia inputs, using at least one of natural language processing techniques, and deep learning techniques. The semantics includes, but are not limited to, contexts, nuances, linguistics, modalities, and the like.

In an exemplary embodiment, the system 102 may determine one or more process specifications and one or more descriptions in an industrial process, using at least one of a dataset and a library comprising representations of industrial processes in a plurality of configurations, using machine learning (ML) models.

In an exemplary embodiment, the system 102 may combine a plurality of types of one or more process specifications and one or more descriptions. In an exemplary embodiment, the system 102 may generate one or more industrial processes corresponding to the one or more multimedia inputs, based on combining the plurality of types of one or more process specifications and one or more descriptions. The generated one or more industrial processes includes, but is not limited to, textual explanation, images, videos, computer aided design (CAD) data, timing diagrams, representations of human motion, representations of human body shape, representations of machine motion, information regarding components, equipment, furniture, workstation layout, operating procedures, augmented reality (AR) content, virtual reality (VR) content, raw materials, and the like.

In an exemplary embodiment, the system 102 may output the generated one or more industrial processes, on at least one of a display of a user device, and one or more external devices. The one or more external devices includes, but are not limited to, a three-dimensional (3D) printer, a manufacturing execution system (MES), an enterprise resource planning (ERP) system, a simulator, and the like.

Figure 2:
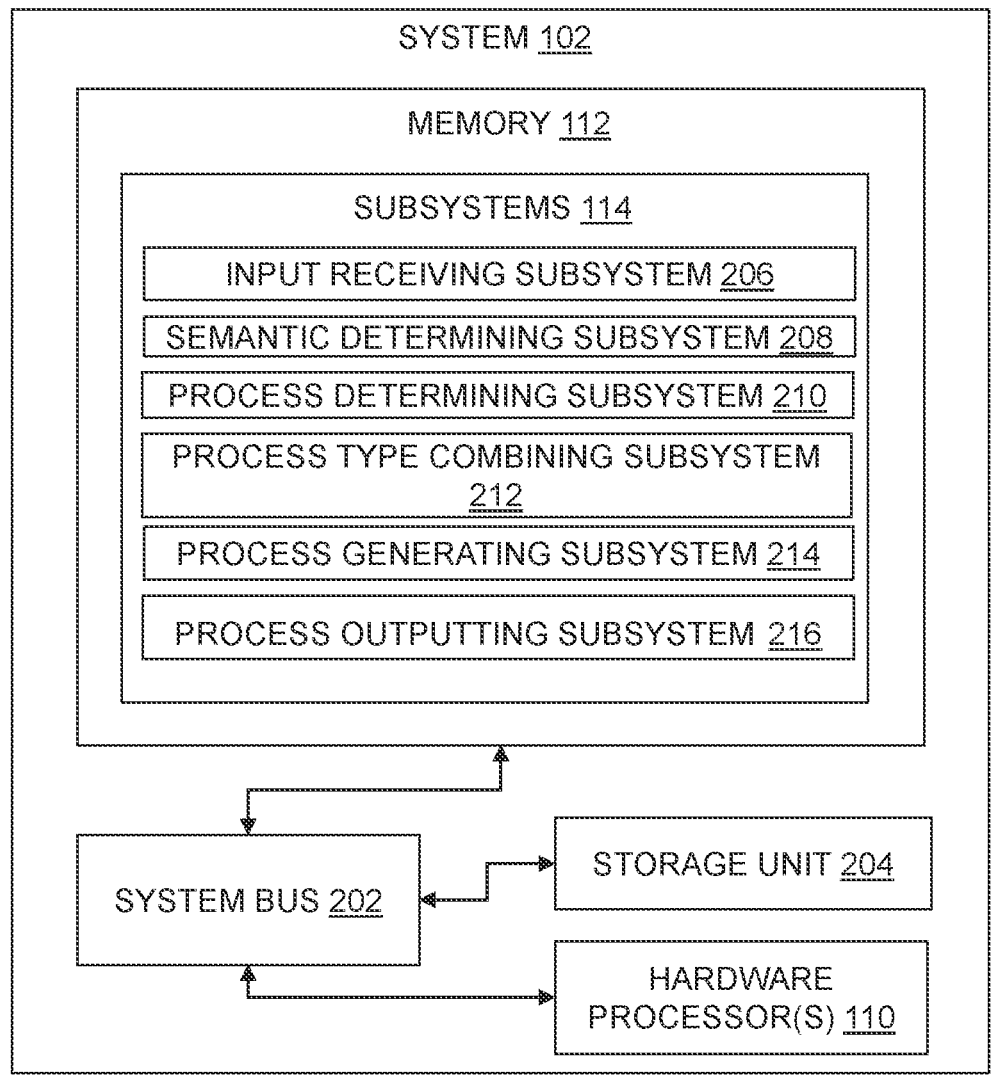
FIG. 2 illustrates an exemplary block diagram representation of a computer-implemented system, such as those shown in FIG. 1, capable of generating industrial process in a computing environment, in accordance with an embodiment of the present disclosure.

FIG. 2 illustrates an exemplary block diagram representation of a computer-implemented system, such as those shown in FIG. 1, capable of generating industrial process in a computing environment, in accordance with an embodiment of the present disclosure. The system 102 may also function as a computer-implemented system (hereinafter referred to as the system 102). The system 102 comprises the one or more hardware processors 110, the memory 112, and a storage unit 204. The one or more hardware processors 110, the memory 112, and the storage unit 204 are communicatively coupled through a system bus 202 or any similar mechanism. The memory 112 comprises a plurality of subsystems 114 in the form of programmable instructions executable by the one or more hardware processors 110.

Further, the plurality of subsystems 114 includes an input receiving subsystem 206, a semantic determining subsystem 208, a process determining subsystem 210, a process type combining subsystem 212, a process generating subsystem 214, and a process outputting subsystem 216.

The one or more hardware processors 110, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 110 may also include embedded controllers, such as generic or programmable logic devices or arrays, application-specific integrated circuits, single-chip computers, and the like.

The memory 112 may be a non-transitory volatile memory and a non-volatile memory. The memory 112 may be coupled to communicate with the one or more hardware processors 110, such as being a computer-readable storage medium. The one or more hardware processors 110 may execute machine-readable instructions and/or source code stored in the memory 112. A variety of machine-readable instructions may be stored in and accessed from the memory 112. The memory 112 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory 112 includes the plurality of modules 114 stored in the form of machine-readable instructions on any of the above-mentioned storage media and may be in communication with and executed by the one or more hardware processors 110.

The storage unit 204 may be a cloud storage or a database such as those shown in FIG. 1. The storage unit 204 may store, but is not limited to, dataset, a library comprising representations of industrial processes in a plurality of configurations, textual explanation, images, videos, computer aided design (CAD) data, timing diagrams, representations of human motion, representations of human body shape, representations of machine motion, information regarding components, equipment, furniture, workstation layout, operating procedures, augmented reality (AR) content, virtual reality (VR) content, and raw materials, three-dimensional (3D) printing data, a manufacturing execution system (MES) data, an enterprise resource planning (ERP) data, a simulator data, any other data, and combinations thereof. The storage unit 204 may be any kind of database such as, but are not limited to, relational databases, dedicated databases, dynamic databases, monetized databases, scalable databases, cloud databases, distributed databases, any other databases, and a combination thereof.

In an exemplary embodiment, the input receiving subsystem 206 may receive one or more multimedia inputs from one or more users via the user device 106. The one or more multimedia inputs includes, but is not limited to, a description of at least one of an industrial process and a warehouse process with a random number, a random number, a general textual description, a description without a random number, an alternative random number, a multimedia content, and the like.

In an exemplary embodiment, the semantic determining subsystem 208 may analyze the received one or more multimedia inputs to determine semantics associated with the one or more multimedia inputs, using at least one of natural language processing techniques, and deep learning techniques. The semantics includes, but are not limited to, contexts, nuances, linguistics, modalities, and the like.

In an exemplary embodiment, the process determining subsystem 210 may determine one or more process specifications and one or more descriptions in an industrial process, using at least one of a dataset and a library comprising representations of industrial processes in a plurality of configurations, using machine learning (ML) models.

In an exemplary embodiment, the process type combining subsystem 212 may combine a plurality of types of one or more process specifications and one or more descriptions. In an exemplary embodiment, the process generating subsystem 214 may generate one or more industrial processes corresponding to the one or more multimedia inputs, based on combining the plurality of types of one or more process specifications and one or more descriptions. In an exemplary embodiment, the generated one or more industrial processes includes, but is not limited to, textual explanation, images, videos, computer aided design (CAD) data, timing diagrams, representations of human motion, representations of human body shape, representations of machine motion, information regarding components, equipment, furniture, workstation layout, operating procedures, augmented reality (AR) content, virtual reality (VR) content, raw materials, and the like.

In an exemplary embodiment, the system 102 may output the generated one or more industrial processes, on at least one of a display of a user device, and one or more external devices. The one or more external devices includes, but are not limited to, a three-dimensional (3D) printer, a manufacturing execution system (MES), an enterprise resource planning (ERP) system, a simulator, and the like.

In an exemplary embodiment, the plurality of subsystems 114 further includes a machine learning (ML) model training subsystem (not shown) configured to train the ML models on a library of industrial process specifications and explanations. Further, the plurality of subsystems 114 includes a putative industrial process generating subsystem (not shown) configured to generate putative industrial process specifications based on the one or more multimedia inputs from the one or more users. Furthermore, the plurality of subsystems 114 includes a process description outputting subsystem (not shown) configured to output process descriptions with three-dimensional (3D) workstation layout and standard operating procedures.

In an exemplary embodiment, the plurality of subsystems 114 further includes a generative modeling subsystem (not shown) configured to perform a generative modeling of the ML models using at least one of an off-the-shelf optimization techniques and objective function. Further, the plurality of subsystems 114 includes an output tuning subsystem (not shown) configured to tune weights and parameters of the ML Models to return output corresponding to the one or more multimedia inputs, during the training of the ML models.

In an exemplary embodiment, the plurality of subsystems 114 further includes the input receiving subsystem configured to receive at least one of input videos, simulations, and programming language representations of industrial processes from the one or more users. Further, the process outputting subsystem is configured to output at least one of textual descriptions, analyses, and prescriptions for process improvement. Furthermore, the plurality of subsystems 114 includes an alternative version generating subsystem (not shown) configured to generate alternative versions of the industrial process based on user prompts. Furthermore, the plurality of subsystems 114 includes a process evaluating subsystem (not shown) configured to evaluate the generated alternative versions of the industrial process through at least one of a simulation and a real-world testing, for selecting appropriate industrial process. The evaluation is at least one of a qualitative evaluation and a quantitative evaluation of the generated alternative versions of the industrial process.

In an exemplary embodiment, the plurality of subsystems 114 further includes human feedback receiving subsystem (not shown) configured to receive a comparative ranking of input-output pairs from the ML models, a quality of intermediate versions of machine learning models, and a quantitative score on specific input-output pairs from the ML models.

In an exemplary embodiment, the plurality of subsystems 114 further includes a seed prompting subsystem (not shown) configured to receive a random seed input for prompting the ML models to generate at least one of relevant and random process specifications, descriptions, and explanations as the industrial processes.

Figure 3A:
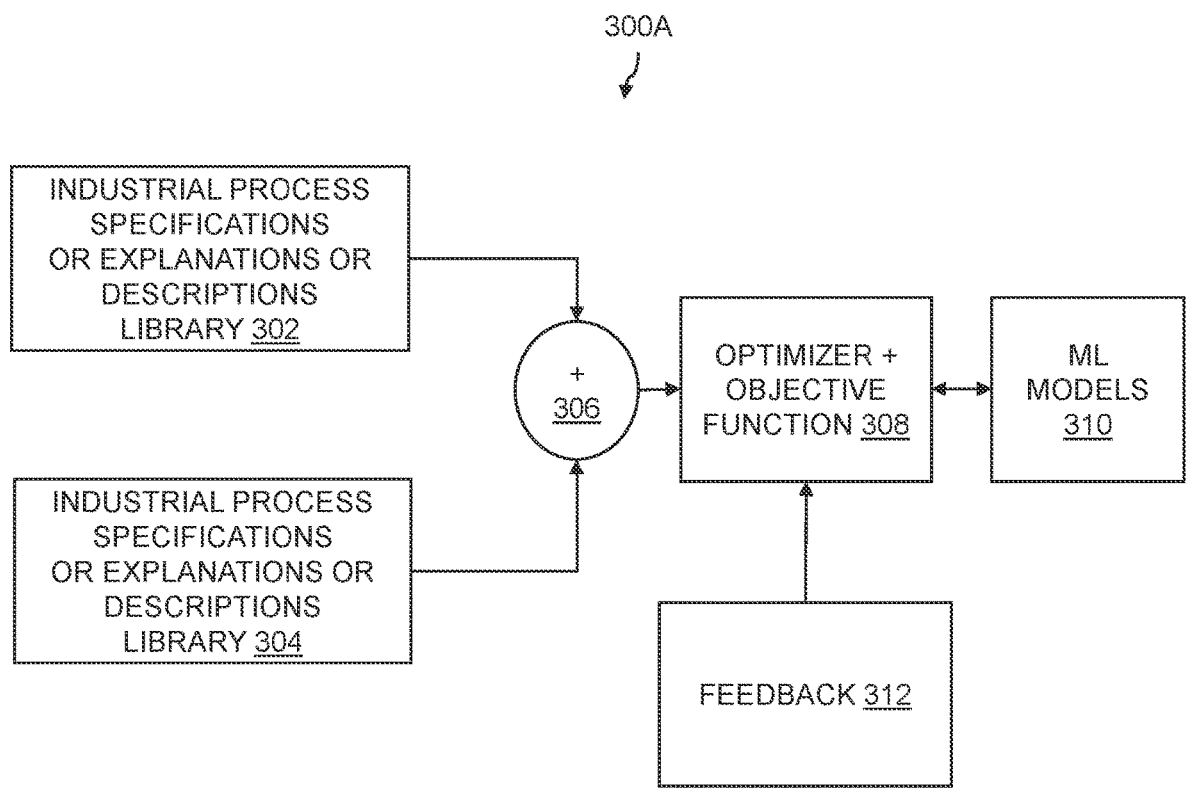
FIG. 3A illustrates an exemplary block diagram representation of method of training the system, in accordance with an embodiment of the present disclosure.

FIG. 3A illustrates an exemplary block diagram representation of method 300A of training the system 102, in accordance with an embodiment of the present disclosure. Consider a procedure for learning one or more weights and one or more parameters of machine learning (ML) models. During training of models in the system 102, at step 302, and 304, an industrial process knowledge in various modalities and regarding various aspects of these processes is provided to a training algorithm associated with system 102, which uses a plurality of optimization algorithms such as any variant of gradient descent optimization or zero-order random number generation based optimization to achieve optimal/appropriate values of objective functions such as any variant of Negative Log-Likelihood (NLL), Ranking Losses, Reinforcement Learning objective like Policy Gradients and REINFORCE, amongst others. In an exemplary embodiment, the training process at step 308 may be in multiple stages. In some embodiments, at step 310, the ML models may already be pre-trained for one or more auxiliary tasks. The one or more auxiliary tasks may include, classification of general image, video, text, computer aided drawings (CAD) model, and the like. In some embodiments, multiple different training algorithms at step 308, i.e., optimization algorithms, objective functions may be utilized for training. In some embodiments, at step 312, human feedback may also be part of the training process. The human feedback may include providing feedback on the quality of intermediate machine learning models. In some embodiments, at step 306, 308, and 310, inputs may be provided by an external service of proprietary ML models. A reinforcement learning with human feedback (RLHF), or completely supervised, or completely unsupervised loss functions may be used to learn the human feedback.

Figure 3B:
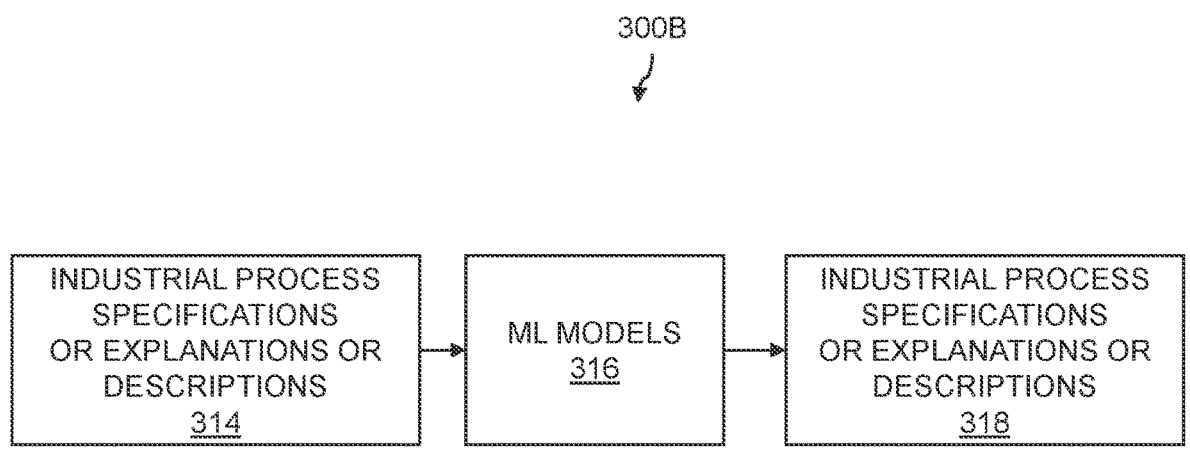
FIG. 3B illustrates an exemplary block diagram representation of a method of generating one or more types of industrial process specification or explanation or description as output when one or more types of industrial process specification or explanation or description is provided as input, in accordance with an embodiment of the present disclosure.

FIG. 3B illustrates an exemplary block diagram representation of a method 3008 of generating one or more types of industrial process specification or explanation or description as output when one or more types of industrial process specification or explanation or description is provided as input, in accordance with an embodiment of the present disclosure. Consider utilizing ML models that have been trained. One of more types of industrial process information and/or queries at step 314, are provided at the input end of the trained ML models. At step 316, the ML models generate the corresponding output at step 318. The random seed in this embodiment which is optional can be used to prompt the ML models to generate different variations of the output. As an example, a user of an embodiment of the system prompts the system with the text, "return a manual process on compact tabletop for screwing parts inside a smartphone including picking up a unit from a conveyor belt, fixing in a fixture, using tweezers to pick up and move material, using screwdriver to tighten six screws, and then taking out the unit from fixture and placing it back on the conveyor for the next workstation on the assembly line. The process should take place without stretching elbow joint by more than 90 degrees." and/or a picture of the workstation. In an embodiment, the trained machine learning models take this prompt and return a file which contain the complete description of the process including workstation layout in 3D as well as the standard operating procedure for a human to perform the task. As one of many possible examples, the output may be in a format that can be interpreted by process simulation software, so it can be animated out in a physics engine that carries out discrete-event simulation. Another alternative embodiment includes, a model may generate a video or animation of the process. In another embodiment, a user may provide a video or simulation or programming language representation of an industrial process to our trained machine learning model, e.g., one where an operator repeatedly installs doors on cars as they arrive in front of her over a moving conveyor belt. In this example, the system (i.e., a machine learning model) may have been trained to return a textual description and/or analysis of the process. In an alternative embodiment, the system may return a textual description of a prescription to improve the process somehow e.g., to improve the ergonomic safety of the operator, or to improve the throughput of the process. In another embodiment, the system may return a video or simulation or programming language representation of an alternative version of the industrial process, e.g., one prompted by the user via a text request that was provided also at input.

Figure 3C:
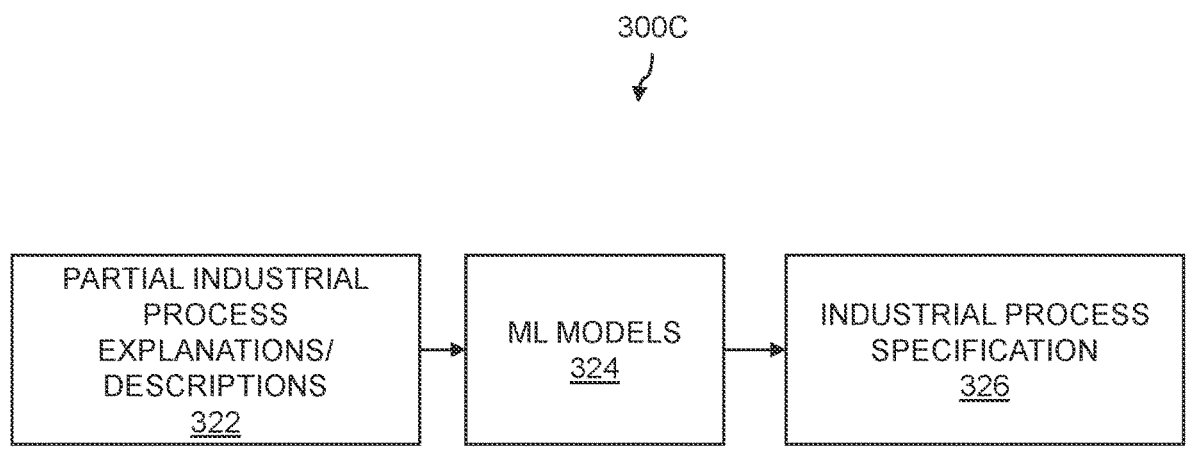
FIG. 3C illustrates an exemplary block diagram representation of a method of generating a detailed process specification from partial/general textual or image or drawing as an input prompt, in accordance with an embodiment of the present disclosure.

FIG. 3C illustrates an exemplary block diagram representation of a method 3000 of generating a detailed process specification from partial/general textual or image or drawing as an input prompt, in accordance with an embodiment of the present disclosure. Consider providing an input, a partial or vague description of an industrial process at step 322. The partial or vague description includes a text, images, or diagrams, feed, at step 324, into a ML models trained for the corresponding input/output pairs output from FIG. 3A. The trained ML Models return, at step 326, a description which includes more details than the input. In some embodiments, the output may be a video or a programmatic description of the process. For example, the output may be a CAD model for workstation layout and motion data for workers and/or automations. In some embodiments, the random seed provides an input lever to generate alternative details that fill in the vagueness left in the input.

Figure 4A:
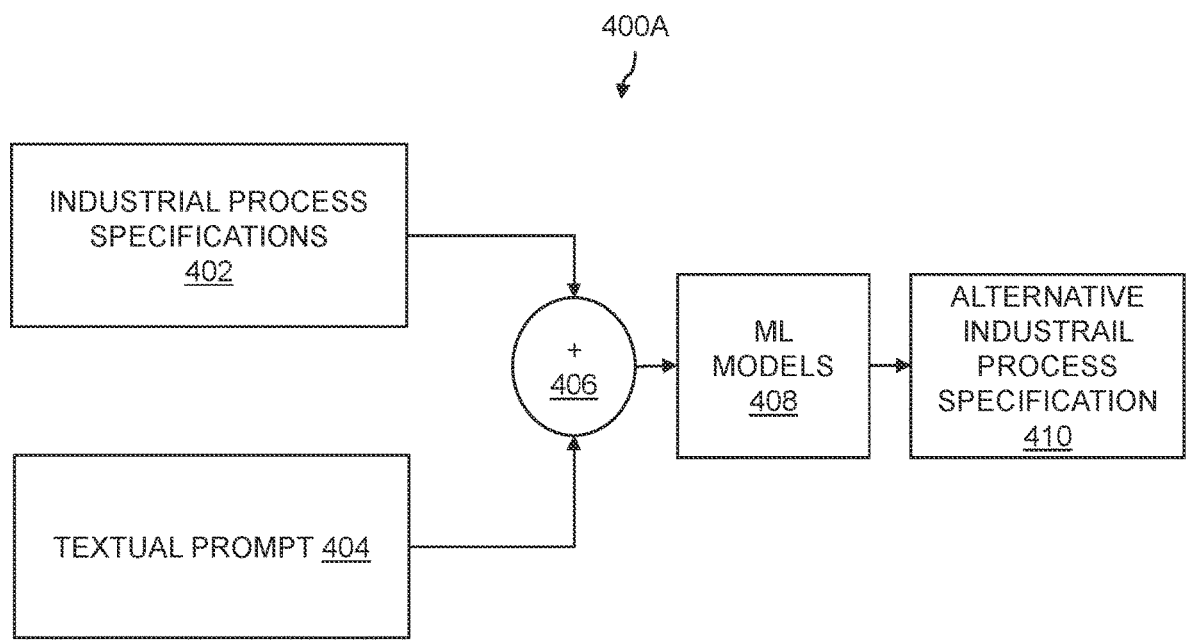
FIG. 4A illustrates an exemplary block diagram representation of a method of returning an alternative industrial process that complies with a textual prompt corresponding to the input industrial process specification, in accordance with an embodiment of the present disclosure.
Figure 4B:
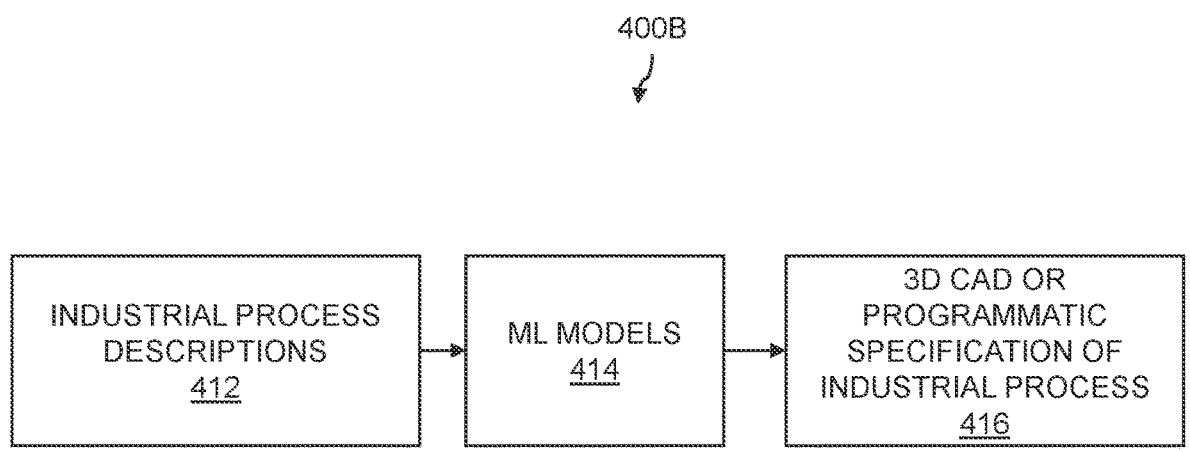
FIG. 4B illustrates an exemplary block diagram representation of a method of returning three-dimensional (3D) computer aided design (CAD) representations of a process from video of a few cycles, in accordance with an embodiment of the present disclosure.

FIG. 4A illustrates an exemplary block diagram representation of a method 400A of returning an alternative industrial process that complies with a textual prompt corresponding to the input industrial process specification, in accordance with an embodiment of the present disclosure. The system 102 may receive, at step 402, a detailed process specification e.g., video recordings of cycles of assembly process, CAD models, programmatic descriptions and the like, as well as a textual prompt at step 404, asking for modifications to the input specifications in certain ways. At step 408, the trained ML models may return corresponding detailed process specifications that incorporate all or some of the requested changes to the industrial process specification at step 410.

FIG. 46 illustrates an exemplary block diagram representation of a method 400B of returning three-dimensional (3D) computer aided design (CAD) representations of a process from video of a few cycles, in accordance with an embodiment of the present disclosure. At step 412, the system 102 receives industrial process description provided as video recordings. At step 414, the models convert an industrial process description provided as video recordings into i.e., CAD representation of the workstation and equipment and/or some concrete representation of operator or automation's motion and/or interaction with the workstation and equipment at step 416. In some embodiments, ML models may be trained for the corresponding pairs of inputs and outputs training time.

Figure 4C:
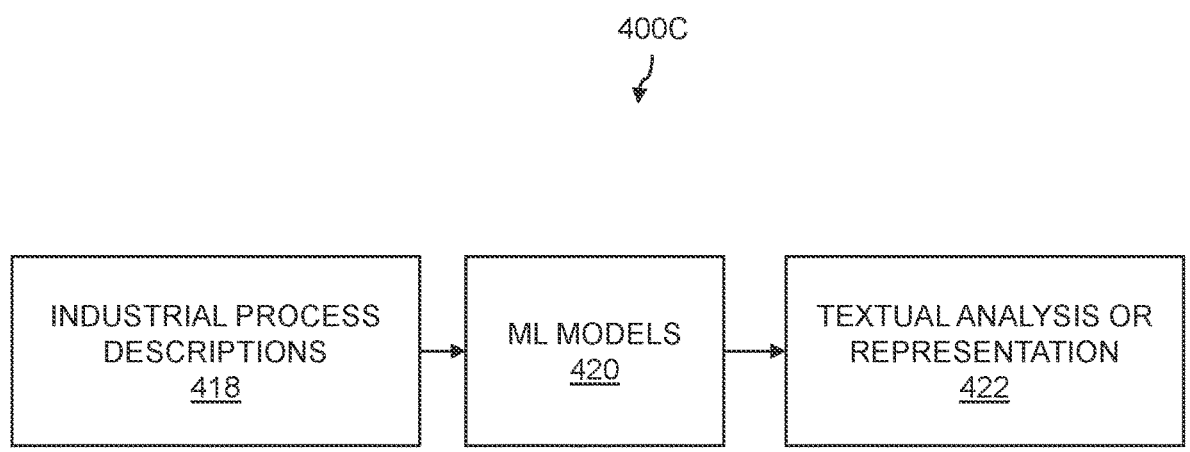
FIG. 4C illustrates an exemplary block diagram representation of a method of returning a textual representation or analysis of a process from video of a few cycles, in accordance with an embodiment of the present disclosure.

FIG. 4C illustrates an exemplary block diagram representation of a method 400C of returning a textual representation or analysis of a process from video of a few cycles, in accordance with an embodiment of the present disclosure. At step 418, the system 102 receives industrial process description provided as video recordings. At step 420, the models convert an input industrial process description. At step 422, the models output CAD data, motion capture information, process videos, or some combination herewith into a textual analysis or representation. In some embodiments, ML models may be trained for the corresponding pairs of inputs and outputs training time.

Figure 4D:
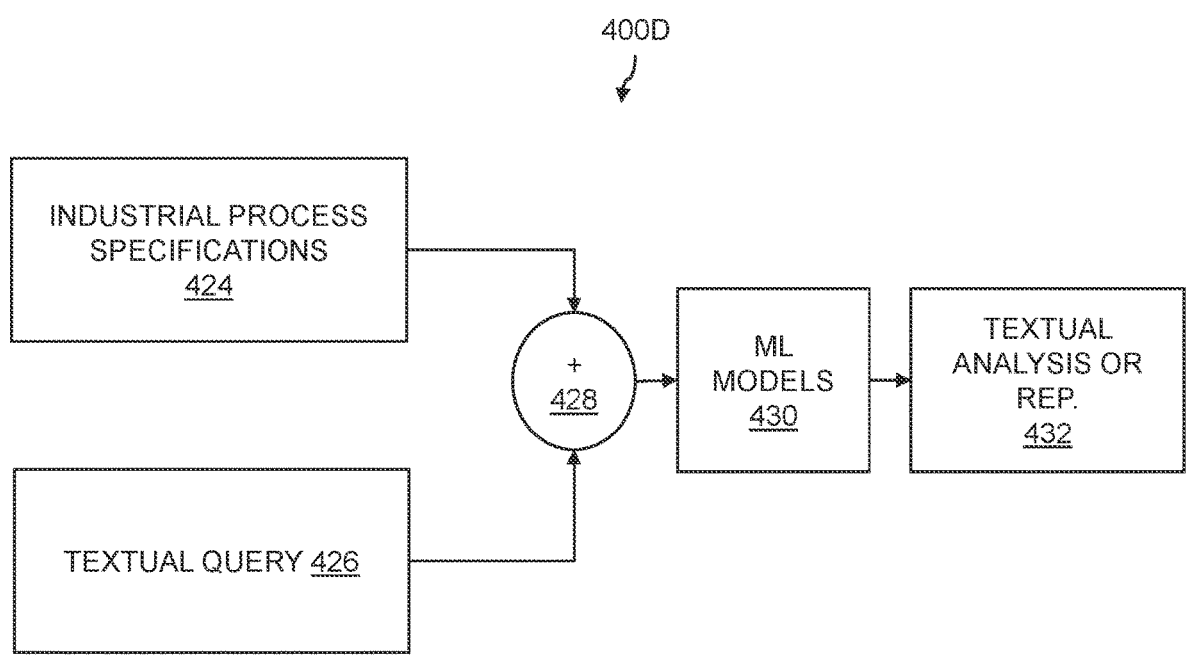
FIG. 4D illustrates an exemplary block diagram representation of a method of providing textual questions regarding an industrial process specification and generating textual answers, in accordance with an embodiment of the present disclosure.

FIG. 4D illustrates an exemplary block diagram representation of a method 400D of providing textual questions regarding an industrial process specification and generating textual answers, in accordance with an embodiment of the present disclosure. At step 424, the system 102 receives an industrial process specification and at step 426, the system 102 receives a textual query regarding the industrial process specification as input. In some embodiments, at step 428, 430, and 432, the ML models return a textual response or explanation that answers the query regarding the input industrial process specification. In some embodiments, the input textual query and/or the output textual response may also include images or figures to elaborate the text.

Figure 4E:
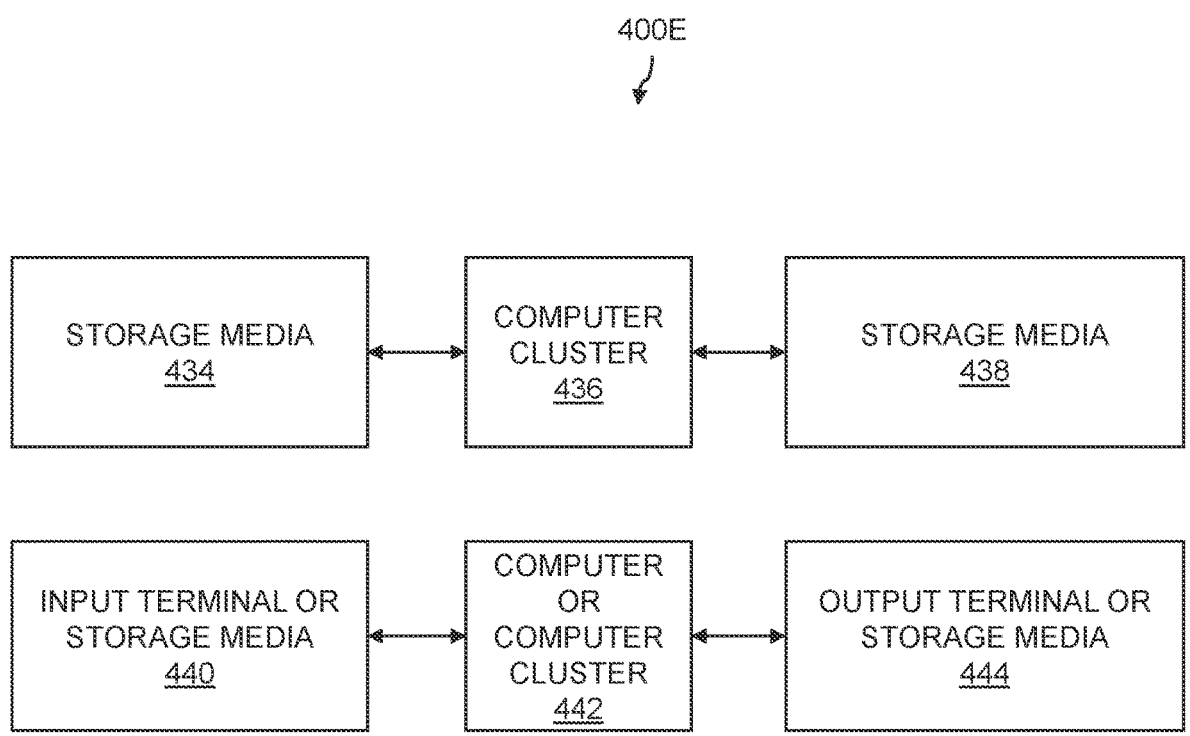
FIG. 4E illustrates an exemplary block diagram representation of a method of training and using the ML models, in accordance with an embodiment of the present disclosure.

FIG. 4E illustrates an exemplary block diagram representation of a method 400E of training and using the ML models, in accordance with an embodiment of the present disclosure. The storage media may include, but is not limited to, hard disk drives, solid state devices (SSDs), random access memory (RAM), internet-based storage, and the like, which stores training algorithms and the input data sets. At step 434 and 440, the data may be stored in the storage media. At step 436 and 442, a networked cluster of computers which is connected to either directly or through a network connection. The training algorithms and associated software infrastructure used for updating model weights and parameters is executed on ML models. At step 438, storing in the storage media, the trained and intermediate model weights. In some embodiments, the storage media and/or the input terminal through which input is provided to the ML models and associated software infrastructure. Input terminal or storage media includes input industrial process explanation. This input terminal may be across an internet, ethernet, or web connection. It may in turn be generated from another generative model for example generative pre-trained transformer (GPT) or any other variant.

In some embodiments, input data is evaluated by the ML models and associated software infrastructure on the computer or compute cluster including multiple computers connected in a network and potentially with special devices for ML model training e.g., graphical processing unit (GPUs) or tensor processing units (TRUs). In some embodiments, at step 444, the output from the ML Models including any post-processing is written down to storage media or shown to user or delivered to another piece of equipment e.g., ARNR device or 3D printer, and the like.

To make the industrial process generation system of the present disclosure, training data may be collected from for example, books, white papers, industrial process records in various forms e.g., spreadsheets with pictures, videos, CAD simulations, and the like, or some combination in some embodiments. In some embodiments, humans could be hired specifically to collect such data from factories. The various types of optimization algorithm, objective function, Machine Learning model architecture, and human feedback amongst others may be chosen from the large variety of off-the-shelf options. These options include but are not limited to: Stochastic Gradient Descent, Adaptive Moment Estimation, Adaptive Gradient Algorithm, Root Mean Square Propagation, Adadelta, Layer-wise Adaptive Moments optimizer for Batch training for the optimization algorithm; Negative Log Likelihood (NLL), Cross-Entropy Loss, Ranking Losses (hinge loss, pairwise loss etc), Reinforcement Learning objectives such as policy gradient or REINFORCE for the objective function: Dolly, Pythia, Bloom, OpenLLaMA, Replit Code, OpenFlamingo amongst many others for the Machine learning model architecture. Similarly, human feedback can be provided to improve machine learning model quality in a variety of Nays e.g. different variants Reinforcement Learning with Human Feedback (RLHF) such as using a learned agent where humans provided scores on the actions taken iteratively to learn a reward model or using an actor-critic algorithm, where human feedback (both positive and negative) is used to tune the advantage function. Human feedback can also be provided through manual dataset curation, fine-tuning with human annotators, active learning, as well as User Feedback Loops amongst others.

Figure 5:
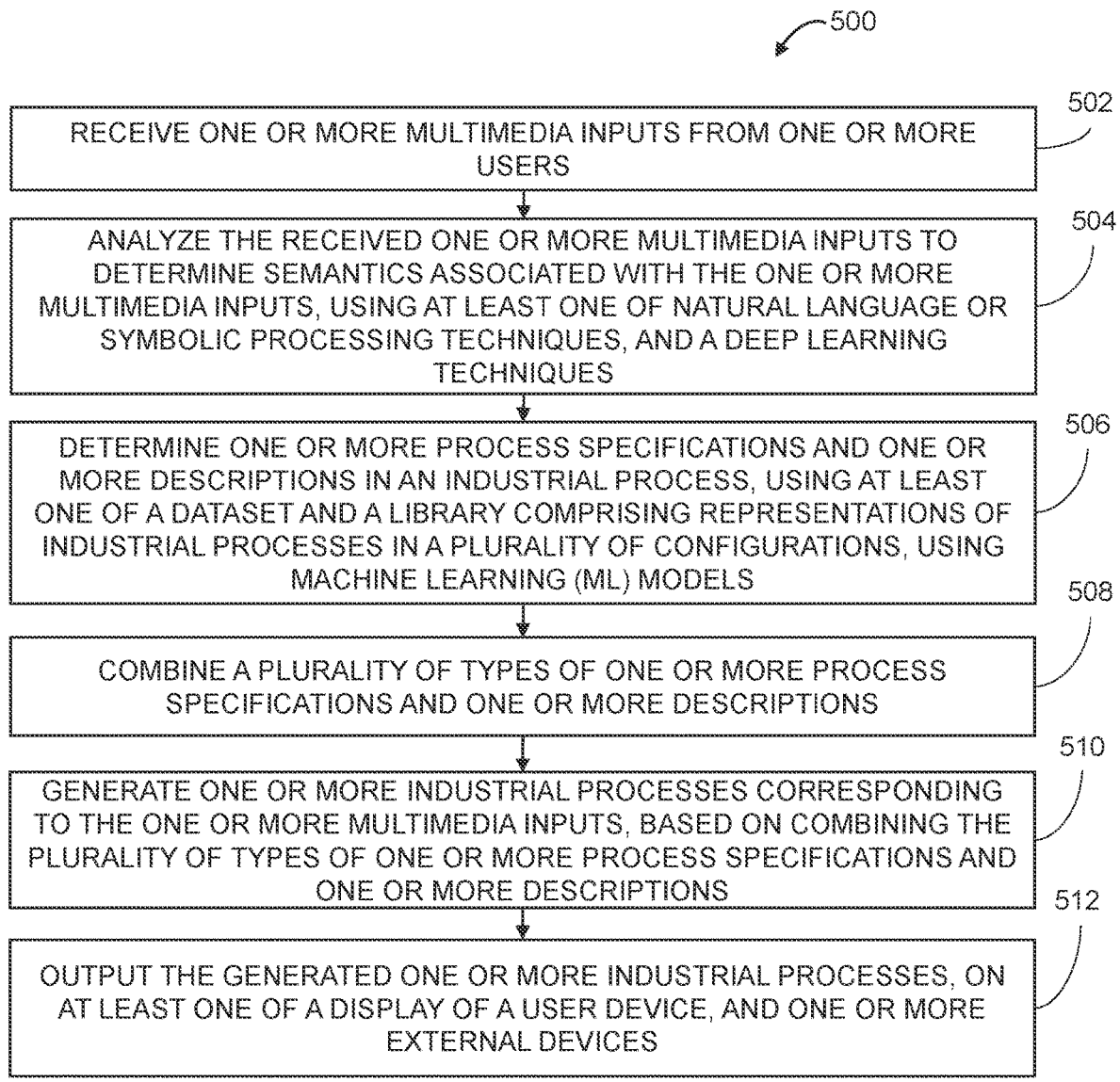

FIG. 5 illustrates a flow chart depicting a method 500 of generating industrial process in a computing environment, in accordance with the embodiment of the present disclosure.

At block 502, the method 500 may include receiving, by one or more hardware processors 110, one or more multimedia inputs from one or more users.

At block 504, the method 500 may include analyzing, by the one or more hardware processors 110, the received one or more multimedia inputs to determine semantics associated with the one or more multimedia inputs, using at least one of natural language processing techniques, and a deep learning technique. The semantics includes, but is not limited to, contexts, nuances, linguistics, and modalities.

At block 506, the method 500 may include determining, by the one or more hardware processors 110, one or more process specifications and one or more descriptions in an industrial process, using at least one of a dataset and a library comprising representations of industrial processes in a plurality of configurations, using machine learning (ML) models.

At block 508, the method 500 may include combining, by the one or more hardware processors 110, a plurality of types of one or more process specifications and one or more descriptions.

At block 510, the method 500 may include generating, by the one or more hardware processors 110, one or more industrial processes corresponding to the one or more multimedia inputs, based on combining the plurality of types of one or more process specifications and one or more descriptions.

At block 512, the method 500 may include outputting, by the one or more hardware processors 110, the generated one or more industrial processes, on at least one of a display of a user device, and one or more external devices.

The method 500 may be implemented in any suitable hardware, software, firmware, or combination thereof. The order in which the method 500 is described is not intended to be construed as a limitation, and any number of the described method blocks may be combined or otherwise performed in any order to implement the method 500 or an alternate method. Additionally, individual blocks may be deleted from the method 500 without departing from the spirit and scope of the present disclosure described herein. Furthermore, the method 500 may be implemented in any suitable hardware, software, firmware, or a combination thereof, that exists in the related art or that is later developed. The method 500 describes, without limitation, the implementation of the system 102. A person of skill in the art will understand that method 500 may be modified appropriately for implementation in various manners without departing from the scope and spirit of the disclosure.

Figure 6:
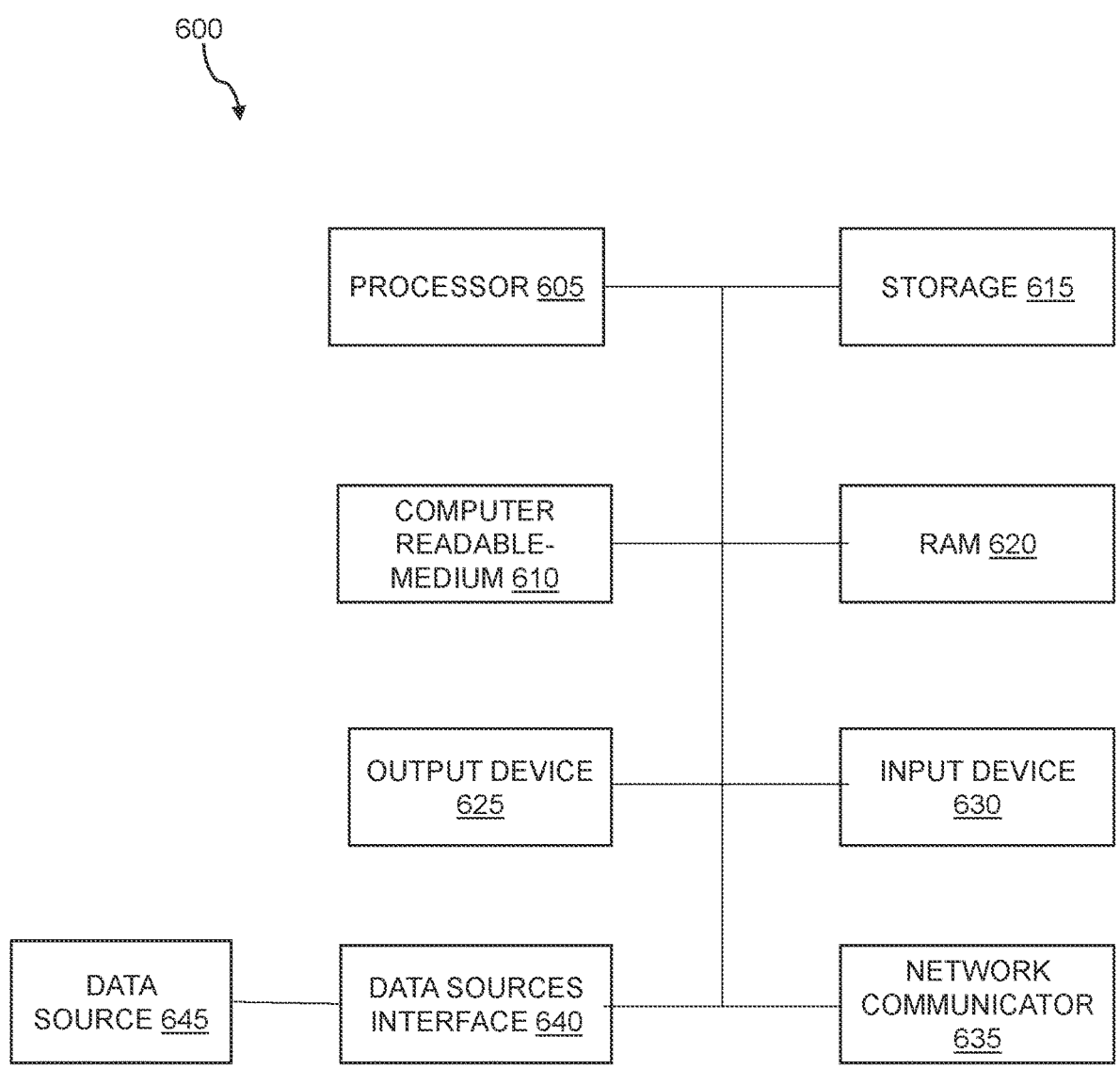
FIG. 6 illustrates a flow chart depicting a method of generating industrial process in a computing environment, in accordance with the embodiment of the present disclosure.

FIG. 6 illustrates an exemplary block diagram representation of a hardware platform 600 for implementation of the disclosed system 102, according to an example embodiment of the present disclosure. For the sake of brevity, the construction, and operational features of the system 102 which are explained in detail above are not explained in detail herein. Particularly, computing machines such as but not limited to internal/external server clusters, quantum computers, desktops, laptops, smartphones, tablets, and wearables may be used to execute the system 102 or may include the structure of the hardware platform 600. As illustrated, the hardware platform 600 may include additional components not shown, and some of the components described may be removed and/or modified. For example, a computer system with multiple GPUs may be located on external-cloud platforms including Amazon Web Services, internal corporate cloud computing clusters, or organizational computing resources.

The hardware platform 600 may be a computer system such as the system 102 that may be used with the embodiments described herein. The computer system may represent a computational platform that includes components that may be in a server or another computer system. The computer system may be executed by the processor 605 (e.g., single, or multiple processors) or other hardware processing circuits, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 605 that executes software instructions or code stored on a non-transitory computer-readable storage medium 610 to perform methods of the present disclosure. The software code includes, for example, instructions to gather data and analyze the data. For example, the plurality of modules 114 includes an interaction model generation module 206, an Artificial Superintelligence (ASI) interface generation module 208, a pattern and issue identification module 210, a machine learning module 212, and an ASI interface optimizer module 214.

The instructions on the computer-readable storage medium 610 are read and stored the instructions in storage 615 or random-access memory (RAM). The storage 615 may provide a space for keeping static data where at least some instructions could be stored for later execution. The stored instructions may be further compiled to generate other representations of the instructions and dynamically stored in the RAM such as RAM 620. The processor 605 may read instructions from the RAM 620 and perform actions as instructed.

The computer system may further include the output device 625 to provide at least some of the results of the execution as output including, but not limited to, visual information to users, such as external agents. The output device 625 may include a display on computing devices and virtual reality glasses. For example, the display may be a mobile phone screen or a laptop screen. GUIs and/or text may be presented as an output on the display screen. The computer system may further include an input device 630 to provide a user or another device with mechanisms for entering data and/or otherwise interacting with the computer system. The input device 630 may include, for example, a keyboard, a keypad, a mouse, or a touchscreen. Each of these output devices 625 and input device 630 may be joined by one or more additional peripherals. For example, the output device 625 may be used to display the results such as bot responses by the executable chatbot.

A network communicator 635 may be provided to connect the computer system to a network and in turn to other devices connected to the network including other clients, servers, data stores, and interfaces, for example. A network communicator 635 may include, for example, a network adapter such as a LAN adapter or a wireless adapter. The computer system may include a data sources interface 640 to access the data source 645. The data source 645 may be an information resource. As an example, a database of exceptions and rules may be provided as the data source 645. Moreover, knowledge repositories and curated data may be other examples of the data source 645.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limited, of the scope of the invention, which is outlined in the following claims.

We claim:

1. A computer-implemented system for generating one or more machine learning based (ML-based) industrial processes in a computing environment the computer-implemented system comprising:
one or more hardware processors:
a memory coupled to the one or more hardware processors, wherein the memory comprises a plurality of subsystems in a form of programmable instructions executable by the one or more hardware processors, wherein the plurality of subsystems comprises:
an input receiving subsystem configured to receive one or more multimedia inputs from one or more users;
a semantic determining subsystem configured to analyze the received one or more multimedia inputs to determine semantics associated with the one or more multimedia inputs, using at least one of: natural language processing techniques, symbolic processing techniques, and deep learning techniques, wherein the semantics comprises at least one of: contexts, nuances, linguistics, and modalities;
a process determining subsystem configured to determine one or more process specifications and one or more descriptions in one or more industrial processes, using machine learning (ML) models, wherein the ML models comprise transformer models, autoencoders, generative adversarial networks, and autoregressive models, wherein the one or more process specifications comprises at least one of: a work cell layout for an assembly operation, a first standard operating procedure for the assembly operation, and a computer language description of the one or more industrial processes, wherein the one or more descriptions comprises a natural language description of the one or more industrial processes;
a machine learning (ML) model training subsystem configured to train the ML models on a library of the one or more process specifications and the one or more descriptions;
a generative modeling subsystem configured to perform a generative modeling of the ML models using at least one of: optimization algorithms, machine learning model architectures, and an objective function:
an output tuning subsystem configured to tune weights and parameters of the ML models to return output corresponding to the one or more multimedia inputs, during the training of the ML models;
a process type combining subsystem configured to combine one or more process specifications and the one or more descriptions;
a process generating subsystem configured to generate the one or more ML-based industrial processes corresponding to the one or more multimedia inputs, based on combining the one or more process specifications and the one or more descriptions; and
a process outputting subsystem configured to output the generated one or more ML-based industrial processes, on one of: a display of a user device and one or more external devices, and wherein the process outputting subsystem comprises a process description outputting subsystem configured to output a description of the one or more ML-based industrial processes with a three-dimensional (3D) workstation layout and second standard operating procedures, wherein the process description outputting subsystem is configured to output the description of the one or more ML-based industrial processes as one of: augmented reality (AR) and virtual reality (VR) representations.

2. The computer-implemented system of claim 1, wherein the plurality of subsystems further comprises:
an industrial process generating subsystem configured to generate industrial process specifications based on the one or more multimedia inputs from the one or more users.

3. The computer-implemented system of claim 1, wherein the plurality of subsystems further comprises:
the input receiving subsystem configured to receive at least one of: input videos, simulations, and programming language representations of the one or more industrial processes from the one or more users;
the process outputting subsystem configured to output at least one: of textual descriptions, analyses, and prescriptions for process improvement;
an alternative version generating subsystem configured to generate alternative versions of the one or more industrial processes based on user prompts; and
a process evaluating subsystem configured to evaluate the generated alternative versions of the one or more industrial processes through at least one of a simulation and a real-world testing, for selecting an appropriate one or more industrial process processes, wherein the evaluation is at least one of: a qualitative evaluation and a quantitative evaluation of the generated alternative versions of the one or more industrial processes.

4. The computer-implemented system of claim 1, wherein the plurality of subsystems further comprises:
a human feedback receiving subsystem configured to receive:
a comparative ranking of input-output pairs from the ML models;
a quality of intermediate versions of the ML models; and
a quantitative score on specific input-output pairs from the ML models.

5. The computer-implemented system of claim 1 wherein the plurality of subsystems further comprises:
a seed prompting subsystem configured to receive a random seed input for prompting the ML models to generate at least one of: random relevant process specifications, and descriptions, of the one or more industrial processes.

6. The computer-implemented system of claim 1, wherein the one or more multimedia inputs comprises at least one of: a description of at least one of the one or more industrial processes and a warehouse process with a random number, a random number, a general textual description, a description without a random number, an alternative random number, and multimedia content.

7. The computer-implemented system of claim 1, wherein the generated one or more industrial processes comprises at least one of: textual description, images, videos, computer aided design (CAD) data, timing diagrams, representations of human motion, representations of human body shape, representations of machine motion, and/or information regarding; components, equipment, furniture, workstation layout, operating procedures, augmented reality (AR) content, virtual reality (VR) content, and raw materials.

8. The computer-implemented system of claim 1 wherein the one or more external devices comprises at least one of: a three-dimensional (3D) printer, a manufacturing execution system (MES), an enterprise resource planning (ERP) system and a simulator.

9. A computer-implemented method for generating one or more a machine learning based (ML-based) industrial processes in a computing environment, the computer-implemented method comprising:
receiving, by one or more hardware processors, one or more multimedia inputs from one or more users:
analyzing, by the one or more hardware processors, the received one or more multimedia inputs to determine semantics associated with the one or more multimedia inputs, using at least one of: natural language processing techniques, symbolic processing techniques, and deep learning techniques, wherein the semantics comprises at least one of: contexts, nuances, linguistics, and modalities;
determining, by the one or more hardware processors, one or more process specifications and one or more descriptions in one or more industrial processes, using machine learning (ML) models wherein the ML models comprise transformer models, autoencoders, generative adversarial networks, and autoregressive models, wherein the one or more process specifications comprises at least one of: a work cell layout for an assembly operation, a first standard operating procedure for the assembly operation, and a computer language description of the one or more industrial processes, wherein the one or more descriptions comprises a natural language description of the one or more industrial processes;
training, by the one or more hardware processors, the ML models on a library of the one or more process specifications and the one or more descriptions:
performing, by the one or more hardware processors, a generative modeling of the ML models using at least one of: optimization algorithms, machine learning model architectures, and an objective function;
tuning weights and parameters, by the one or more hardware processors of the ML models to return output corresponding to the one or more multimedia inputs, during the training of the ML models;
combining, by the one or more hardware processors, the one or more process specifications and the one or more descriptions;
generating, by the one or more hardware processors, the one or more ML-based industrial processes corresponding to the one or more multimedia inputs, based on combining the plurality of types of the one or more process specifications and the one or more descriptions; and
outputting, by the one or more hardware processors, the generated one or more ML-based industrial processes, on one of a display of a user device, and one or more external devices and wherein the outputting of the generated one or more ML-based industrial processes comprises outputting a description of the one or more ML-based industrial processes with a three-dimensional (3D) workstation layout and second standard operating procedures, and wherein the outputting of the description of the one or more ML-based industrial processes is configured to output the description as one of: augmented reality (AR) and virtual reality (VR) representations.

10. The computer-implemented method of claim 9 further comprising:
generating, by the one or more hardware processors, industrial process specifications based on the one or more multimedia inputs from the one or more users.

11. The computer-implemented method of claim 9 further comprising:
receiving, by the one or more hardware processors, at least one of: input videos, simulations, and programming language representations of the one or more industrial processes from the one or more users;
outputting, by the one or more hardware processors, at least one of: textual descriptions, analyses, and prescriptions for process improvement;
generating, by the one or more hardware processors, alternative versions of the one or more industrial processes based on user prompts: and
evaluating, by the one or more hardware processors, the generated alternative versions of the one or more industrial processes through at least one of; a simulation and a real-world testing, for selecting an appropriate one or more industrial process processes, wherein the evaluation is at least one of: a qualitative evaluation and a quantitative evaluation of the generated alternative versions of the one or more industrial processes.

12. The computer-implemented method of claim 9 further comprising:
receive, by the one or more hardware processors:
a comparative ranking of input-output pairs from the ML models:
a quality of intermediate versions of the ML models; and a quantitative score on specific input-output pairs from the ML models.

13. The computer-implemented method of claim 9 further comprising:
receiving, by the one or more hardware processors, a random seed input for prompting the ML models to generate at least one of: random relevant process specifications, and descriptions, of the one or more industrial processes.

14. The computer-implemented method of claim 9, wherein the one or more multimedia inputs comprises at least one of: a description of at least one of the one or more industrial processes and a warehouse process with a random number, a random number, a general textual description, a description without a random number, an alternative random number, and multimedia content.

15. The computer-implemented method of claim 9, wherein the generated one or more industrial processes comprises at least one of: textual description explanation, images, videos, computer aided design (CAD) data, timing diagrams, representations of human motion, representations of human body shape, representations of machine motion, and information regarding at least one of: components, equipment, furniture, workstation layout, operating procedures, augmented reality (AR) content, virtual reality (VR) content, and raw materials.

16. The computer-implemented method of claim 9, wherein the one or more external devices comprises at least one of: a three-dimensional (3D) printer, a manufacturing execution system (MES), an enterprise resource planning (ERP) system, and a simulator.

17. A non-transitory computer-readable storage medium having programmable instructions stored therein, that when executed by one or more hardware processors, cause the one or more hardware processors to:
receive one or more multimedia inputs from one or more users:
analyze the received one or more multimedia inputs to determine semantics associated with the one or more multimedia inputs, using at least one of: natural language processing techniques, symbolic processing techniques, and deep learning techniques, wherein the semantics comprises at least one of: contexts, nuances, linguistics, and modalities;
determine one or more process specifications and one or more descriptions in one or more industrial process processes, using machine learning (ML) models wherein the ML models comprise transformer models, autoencoders, generative adversarial networks, and autoregressive models, wherein the one or more process specifications comprises at least one of: a work cell layout for an assembly operation, a first standard operating procedure for the assembly operation, and a computer language description of the one or more industrial processes, wherein the one or more descriptions comprises a natural language description of the one or more industrial processes;
a machine learning (ML) model training subsystem configured to train the ML models on a library of the one or more process specifications and the one or more descriptions:
a generative modeling subsystem configured to perform a generative modeling of the ML models using at least one of: optimization algorithms, machine learning model architectures, and an objective function;
an output tuning subsystem configured to tune weights and parameters of the ML models to return output corresponding to the one or more multimedia inputs, during the training of the ML models;
combine the one or more process specifications and the one or more descriptions;
generate one or more machine learning based (ML-based) industrial processes corresponding to the one or more multimedia inputs, based on combining the one or more process specifications and the one or more descriptions: and
output the generated one or more ML-based industrial processes, on one of: a display of a user device and one or more external devices and wherein the outputting of the generated one or more ML-based industrial processes, comprises outputting a description of the one or more ML-based industrial processes with a three-dimensional (3D) workstation layout and second standard operating procedures, and wherein the outputting of the description of the one or more ML-based industrial processes is configured to output the description as one of: augmented reality (AR) and virtual reality (VR) representations.

18. The non-transitory computer-readable storage medium of claim 17, wherein the one or more hardware processors is further configured to:
generate industrial process specifications based on the one or more multimedia inputs from the one or more users.

* * * * *